United States Patent
Cok

(10) Patent No.: US 9,492,993 B2
(45) Date of Patent: Nov. 15, 2016

(54) CHIPLET DISPLAY WITH MULTIPLE PASSIVE-MATRIX CONTROLLERS

(71) Applicant: GLOBAL OLED TECHNOLOGY LLC, Herndon, VA (US)

(72) Inventor: Ronald S Cok, Rochester, NY (US)

(73) Assignee: Global OLED Technology LLC, Herndon, VA (US)

(*) Notice: Subject to any disclaimer, the term of this patent is extended or adjusted under 35 U.S.C. 154(b) by 0 days.

(21) Appl. No.: 14/717,249

(22) Filed: May 20, 2015

(65) Prior Publication Data

US 2015/0251402 A1 Sep. 10, 2015

Related U.S. Application Data

(63) Continuation of application No. 12/426,986, filed on Apr. 21, 2009, now Pat. No. 9,070,323.

(51) Int. Cl.
*B32B 37/24* (2006.01)
*G09G 3/32* (2016.01)
*B32B 37/12* (2006.01)

(52) U.S. Cl.
CPC .............. *B32B 37/24* (2013.01); *B32B 37/12* (2013.01); *G09G 3/3266* (2013.01); *G09G 3/3275* (2013.01); *B32B 2037/243* (2013.01); *B32B 2307/202* (2013.01); *B32B 2307/40* (2013.01); *B32B 2457/20* (2013.01); *G09G 2310/0218* (2013.01); *G09G 2310/0221* (2013.01); *G09G 2310/0278* (2013.01); *G09G 2310/0286* (2013.01)

(58) Field of Classification Search
CPC .............. G09G 3/3266; G09G 3/3275; G09G 2310/0218; G09G 2310/0221; G09G 2310/0278; G09G 2310/0286; B32B 2457/20; B32B 37/12; B32B 37/24; B32B 2037/243; B32B 2307/202; B32B 2307/40
See application file for complete search history.

(56) References Cited

U.S. PATENT DOCUMENTS

| | | | | |
|---|---|---|---|---|
| 2002/0053881 | A1* | 5/2002 | Odake | G09G 3/20 315/169.1 |
| 2005/0206585 | A1* | 9/2005 | Stewart | G09G 3/14 345/34 |
| 2007/0105255 | A1* | 5/2007 | Nishimura | H01L 27/3276 438/34 |
| 2010/0207851 | A1* | 8/2010 | Cok | G09G 3/3208 345/82 |

* cited by examiner

*Primary Examiner* — Jacob T Minskey
*Assistant Examiner* — Vishal I Patel
(74) *Attorney, Agent, or Firm* — Global OLED Technology LLC

(57) ABSTRACT

A display device includes a substrate having a display area; row electrodes formed over the substrate in the display area extending in a row direction and column electrodes formed over the substrate in the display area extending in a column direction different from the row direction, the row and column electrodes overlapping to form pixels; wherein the pixels are divided into two or more separate pixel groups, each pixel group having group row electrodes and separate group column electrodes; two or more spaced column driver chiplets located in the display area, each column driver chiplet uniquely connected to a different pixel group wherein in at least one of the column driver chiplets is located between pixel groups, and the two or more spaced column driver chiplets adapted to drive the group column electrodes of the one pixel group; and one or more row driver(s) connected to the row electrodes.

2 Claims, 13 Drawing Sheets

CHIPLET DISPLAY WITH MULTIPLE PASSIVE-MATRIX CONTROLLERS

CROSS REFERENCE TO RELATED APPLICATIONS

This application is a continuation of U.S. patent application Ser. No. 12/426,986, filed Apr. 21, 2009 entitled "CHIPLET DISPLAY WITH MULTIPLE PASSIVE-MATRIX CONTROLLERS." Reference is made to commonly-assigned U.S. patent application Ser. No. 12/372,132 filed Feb. 17, 2009 titled "CHIPLET DRIVER PAIRS FOR TWO-DIMENSIONAL DISPLAY" to Ronald S. Cok, et al., the disclosure of which is incorporated herein.

FIELD OF THE INVENTION

The present invention relates to display devices having a substrate with distributed, independent chiplets for controlling a pixel array.

BACKGROUND OF THE INVENTION

Flat-panel display devices are widely used in conjunction with computing devices, in portable devices, and for entertainment devices such as televisions. Such displays typically employ a plurality of pixels distributed over a substrate to display images. Each pixel incorporates several, differently colored light-emitting elements commonly referred to as sub-pixels, typically emitting red, green, and blue light to represent each image element. As used herein, pixels and sub-pixels are not distinguished and refer to a single light-emitting element. A variety of flat-panel display technologies are known, for example, plasma displays, liquid crystal displays, and light-emitting diode (LED) displays.

Light emitting diodes (LEDs) incorporating thin films of light-emitting materials forming light-emitting elements have many advantages in a flat-panel display device and are useful in optical systems. U.S. Pat. No. 6,384,529 issued May 7, 2002 to Tang et al. shows an organic LED (OLED) color display that includes an array of organic LED light-emitting elements. Alternatively, inorganic materials can be employed and can include phosphorescent crystals or quantum dots in a polycrystalline semiconductor matrix. Other thin films of organic or inorganic materials can also be employed to control charge injection, transport, or blocking to the light-emitting-thin-film materials, and are known in the art. The materials are placed upon a substrate between electrodes, with an encapsulating cover layer or plate. Light is emitted from a pixel when current passes through the light-emitting material. The frequency of the emitted light is dependent on the nature of the material used. In such a display, light can be emitted through the substrate (a bottom emitter) or through the encapsulating cover (a top emitter), or both.

LED devices can comprise a patterned light-emissive layer wherein different materials are employed in the pattern to emit different colors of light when current passes through the materials. Alternatively, one can employ a single emissive layer, for example, a white-light emitter, together with color filters for forming a full-color display, as is taught in U.S. Pat. No. 6,987,355 entitled, "Stacked OLED Display having Improved Efficiency" by Cok. It is also known to employ a white sub-pixel that does not include a color filter, for example, as taught in U.S. Pat. No. 6,919,681 entitled, "Color OLED Display with Improved Power Efficiency" by Cok et al. A design employing an unpatterned white emitter has been proposed together with a four-color pixel comprising red, green, and blue color filters and sub-pixels and an unfiltered white sub-pixel to improve the efficiency of the device (see, e.g. U.S. Pat. No. 7,230,594 issued Jun. 12, 2007 to Miller, et al).

Two different methods for controlling the pixels in a flat-panel display device are generally known: active-matrix control and passive-matrix control. In a passive-matrix device, the substrate does not include any active electronic elements (e.g. transistors). An array of row electrodes and an orthogonal array of column electrodes in a separate layer are formed over the substrate; the overlapping intersections between the row and column electrodes form the electrodes of a light-emitting diode. External driver chips then sequentially supply current to each row (or column) while the orthogonal column (or row) supplies a suitable voltage to illuminate each light-emitting diode in the row (or column). Therefore, a passive-matrix design employs 2n connections to produce $n^2$ separately controllable light-emitting elements. However, a passive-matrix drive device is limited in the number of rows (or columns) that can be included in the device since the sequential nature of the row (or column) driving creates flicker. If too many rows are included, the flicker can become perceptible: Moreover, the currents necessary to drive an entire row (or column) in a display can be problematic since the power required for the non-imaging pre-charge and discharge steps of PM driving become dominant as the area of the PM display grows. These problems limit the physical size of a passive-matrix display.

In an active-matrix device, active control elements are formed of thin films of semiconductor material, for example amorphous or poly-crystalline silicon, coated over the flat-panel substrate. Typically, each sub-pixel is controlled by one control element and each control element includes at least one transistor. For example, in a simple active-matrix organic light-emitting (OLED) display, each control element includes two transistors (a select transistor and a power transistor) and one capacitor for storing a charge specifying the luminance of the sub-pixel. Each light-emitting element typically employs an independent control electrode and an electrode electrically connected in common. Control of the light-emitting elements is typically provided through a data signal line, a select signal line, a power connection and a ground connection. Active-matrix elements are not necessarily limited to displays and can be distributed over a substrate and employed in other applications requiring spatially distributed control. The same number of external control lines (except for power and ground) can be employed in an active-matrix device as in a passive-matrix device. However, in an active-matrix device, each light-emitting element has a separate driving connection from a control circuit and is active even when not selected for data deposition so that flicker is eliminated.

One common, prior-art method of forming active-matrix control elements typically deposits thin films of semiconductor materials, such as silicon, onto a glass substrate and then forms the semiconductor materials into transistors and capacitors through photolithographic processes. The thin-film silicon can be either amorphous or polycrystalline. Thin-film transistors (TFTs) made from amorphous or poly-crystalline silicon are relatively large and have lower performance compared to conventional transistors made in crystalline silicon wafers. Moreover, such thin-film devices typically exhibit local or large-area non-uniformity across the glass substrate that results in non-uniformity in the electrical performance and visual appearance of displays employing such materials. In such active-matrix designs, each light-emitting element requires a separate connection to a driving circuit.

Employing an alternative control technique, Matsumura et al describe crystalline silicon substrates used for driving LCD displays in U.S. Patent Application 2006/0055864. The application describes a method for selectively transferring and affixing pixel-control devices made from first semiconductor substrates onto a second planar display substrate. Wiring interconnections within the pixel-control device and connections from busses and control electrodes to the pixel-control device are shown.

Since a conventional passive-matrix display design is limited in size and number of light-emitting elements, and an active-matrix design using TFTs has lower electrical performance and complex substrates, there is a need for an improved control method for display devices that overcomes these problems.

SUMMARY OF THE INVENTION

In accordance with the present invention, there is provided a display device, comprising:

a) a substrate having a display area;

b) a plurality of row electrodes formed over the substrate in the display area extending in a row direction and a plurality of column electrodes formed over the substrate in the display area extending in a column direction different from the row direction, the row and column electrodes overlapping to form pixels;

c) wherein the pixels are divided into two or more separate pixel groups, each pixel group having group row electrodes and separate group column electrodes;

d) two or more spaced column driver chiplets located in the display area, each column driver chiplet uniquely connected to a different pixel group wherein in at least one of the column driver chiplets is located between pixel groups, and the two or more spaced column driver chiplets adapted to drive the group column electrodes of the one pixel group;

e) one or more row driver(s) connected to the row electrodes; and f) wherein the row drivers and the column driver chiplets cooperatively drive the row and column electrodes, respectively, to activate the pixels.

Advantages

The present invention has the advantage that, by providing a display device having a plurality of pixels divided into two or more separate pixel groups with chiplet column drivers located between pixel groups, performance is improved and the number of components and connections is reduced. Further, by having separate row and column driver chiplets, each chiplet can be made with the lowest cost semiconductor fabrication process available for each chiplet.

Figure 1A:
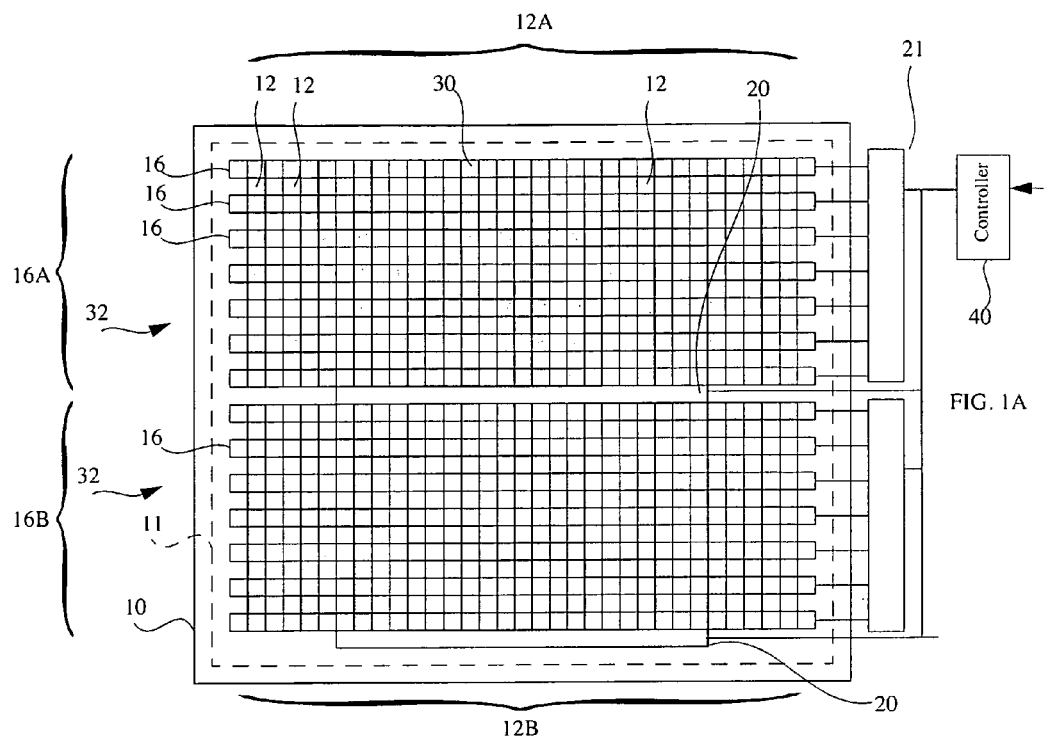
FIG. 1A is a plan view of a substrate with two pixel groups, two column driver chiplets, and an external row drivers according to an embodiment of the present invention.

Because the various layers and elements in the drawings have greatly different sizes, the drawings are not to scale.

DETAILED DESCRIPTION OF THE INVENTION

Referring to FIG. 1A, in one embodiment of the present invention, a display device comprises a substrate 10 having a display area 11. A plurality of row electrodes 16 is formed over the substrate 10 in the display area 11 extending in a row direction and a plurality of column electrodes 12 are formed over the substrate 10 in the display area 11 extending in a column direction different from the row direction. The row and column electrodes 16, 12 overlap to form pixels 30. Typically, the row direction is orthogonal to the column direction and the pixels 30 form a regular array over the substrate 10.

The pixels 30 are divided into two or more separate pixel groups 32, each pixel group 32 having group row electrodes 16A, 16B and separate group column electrodes 12A, 12B. By separate group column electrodes is meant that the column electrodes of one pixel group are electrically isolated from the column electrodes of another pixel group. In FIG. 1A, the pixels 30 are divided into two pixel groups 32, one pixel group 32 in the upper half of the substrate 10 and the other pixel group 32 in the lower half of the substrate 10. The column electrodes 12 for each group are not electrically connected and each group of column electrodes only extends half of the way across the substrate 10 from the bottom to the top of FIG. 1A.

Two or more spaced column driver chiplets 20 are located in the display area 11, at least one column driver chiplet 20 is located between at least one pixel of each of two different pixel groups 32 so that there are at least two pixel groups in the column direction and a column driver chiplet 20 between at least a portion of each of the two pixel groups so that at least one column driver chiplet 20 is not at the edge of the display area but within the display area with pixels surrounding it on each side. Each column driver chiplet 20 is uniquely connected to the group column electrodes 12 of one pixel group 32 and is adapted to drive the group column electrodes 12 of the one pixel group 32. One or more row driver(s) 21 are connected to the row electrodes 16. The row drivers 21 and the two or more spaced column driver chiplets 20 are adapted to drive the row and column electrodes 16, 12, respectively, to activate the pixels 30. A controller 40 is connected to the row drivers 21 and column driver chiplets 20 to provide image information and control signals.

According to the present invention, the row and column electrodes 16, 12 control the pixels 30. In one embodiment, (e.g. FIGS. 8A, 8B) light-emitting material 14, for example, organic materials or inorganic quantum dot materials are located between the row and column electrodes 16, 12. When a current passes from one electrode through the light-emitting material 14 in the pixel area 30 to the other electrode, light is emitted in proportion to the current density in the material, for example, as is the case with an organic light-emitting diode.

The row and column electrodes 16, 12 can be formed in separate layers and each pixel group 32 can have passive-matrix control controlled by the row drivers 23 and column driver chiplets, 20. According to the present invention, the pixels 30 formed by the overlap of the row and column electrodes 16, 12 are divided into pixel groups 32. At least two pixel groups are formed by separating the column electrodes 12 into two or more column electrode groups 12A, 12B in the column direction. As shown in FIG. 1A, two column electrodes 12 are present in each column over the substrate 10. In the bottom half of the display area 11 a first group of column electrodes 12B extend from the bottom of the display 11 area to the middle of the display in the column direction. A second group of column electrodes 12A extends from the middle of the display to the top of the display in the column direction. Each of these two groups of column electrodes 12B, 12A form a separate pixel group 32 in the column direction and each of the pixel groups 32 is controlled by a separate column driver chiplet 20. In the examples of FIGS. 1A-1D (and FIGS. 2A-2G), the column driver chiplet 20 is located directly beneath the pixel group 32 that it controls. In the example of FIG. 1A, each pixel group 32 has a different set of row electrodes 16 driven by an external row driver 21. As used herein, the designation "row" and "column" are arbitrary and can be exchanged.

Figure 8A:
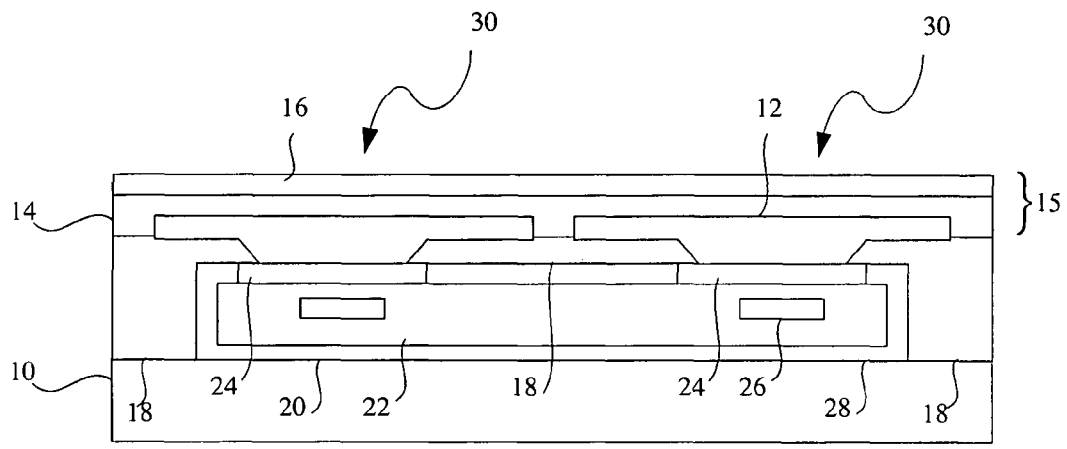
FIG. 8A is a partial cross section of a row driver chiplet according to an embodiment of the present invention.
Figure 8B:
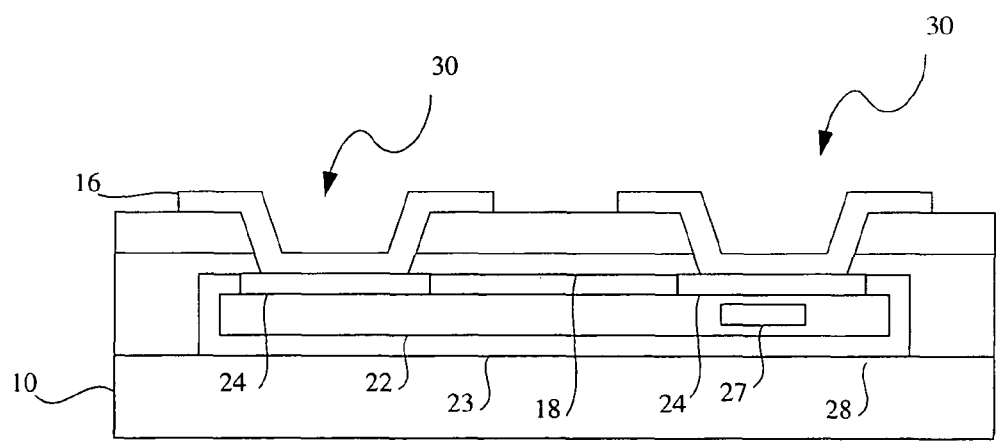
FIG. 8B is a partial cross section of a column driver chiplet according to an embodiment of the present invention.
Figure 9:
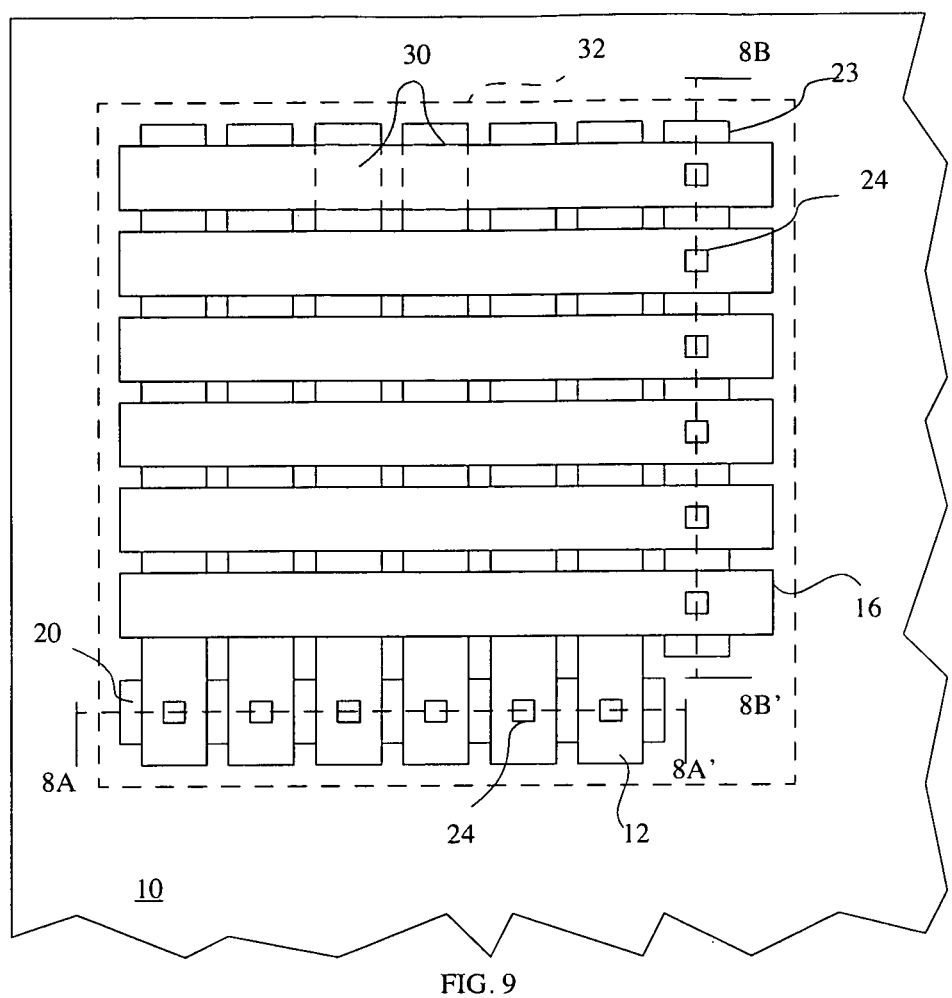
FIG. 9 is a plan view of a substrate portion with a pixel group, group row and column electrodes, a row driver chiplet, and a column driver chiplet according to an embodiment of the present invention.

A more detailed illustration of the row and column electrodes 16, 12 is found in FIG. 9. Referring to FIG. 9, row electrodes 16 and column electrodes 12 formed on a substrate 10 overlap to form pixel areas 30 defining a pixel group 32. A column driver chiplet 20 electrically connects to the column electrodes 12 through connection pads 24 formed on the chiplet. In this embodiment, the row driver chiplet 23 is electrically connected to the row electrodes 16 through connection pads 24 formed on the row driver chiplet 23. Cross sections 8A, 8A' and 8B, 8B' are illustrated in FIGS. 8A and 8B.

FIG. 8A is a cross section of 8A, 8A' (in FIG. 9) of an embodiment of the device. Referring to FIG. 8A, a column driver chiplet 20 having a separate chiplet substrate 28 is adhered to a substrate 10 and buried with adhesion layer 18. The column driver chiplet 20 includes circuitry 22 and data value registers 26. Column electrodes 12 are electrically connected to connection pads 24 formed on the column driver chiplet 20. Light-emitting material 14 is located over the column electrodes 12 and row electrodes 16 formed over the light-emitting material 14. (A row electrode 16 is shown over the column driver chiplet 20 although the corresponding row electrode is omitted from FIG. 9 for clarity.) The light-emitting material 14 can include multiple layers of light-emitting material as well as various charge-control layers as are known in the organic and inorganic light-emitting diode art. The electrodes 12, 16 and light-emitting material 14 form a light-emitting diode 15. FIG. 8B is a cross section of 8B, 8B' (in FIG. 9) of an embodiment of the device. Referring to FIG. 8B, a row driver chiplet 23 having a separate chiplet substrate 28 is adhered to a substrate 10 and buried with adhesion layer 18. The row driver chiplet 23 includes circuitry 22 and a rotary serial shift register 27. Row electrodes 16 are electrically connected to connection pads 24 formed on the chiplet 23. The areas overlapping both the column electrodes 12 and the row electrodes 16 in FIG. 8A form pixels 30 that can emit light when current is passed through the light-emitting material 14 from the row electrode 16 and column electrode 12 by the column driver chiplet 20 and row driver chiplet 23 through the connection pads 24 and controlled by the chiplet circuitry 22 in the column driver chiplet 20 and row driver chiplet 23.

The present invention can be employed in both a top-emitter configuration and in a bottom emitter configuration. However, as shown in FIGS. 8A and 8B, the chiplets are located in a layer beneath the row and column electrodes and occupy space over the substrate. Thus, a top-emitter configuration can be preferred so that the emitting area of the device is increased.

Figure 1B:
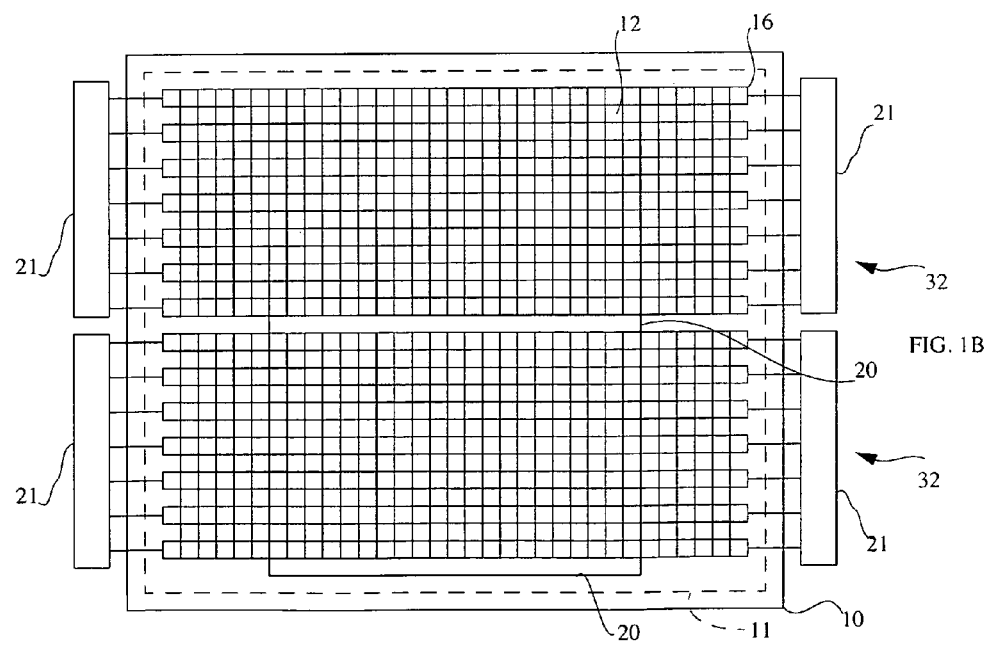
FIG. 1B is a plan view of a substrate with two pixel groups, two column driver chiplets, and two external row drivers according to an alternative embodiment of the present invention.

A variety of pixel groups with column driver chiplet and row driver arrangements are included within various embodiments of the present invention. Referring to FIG. 1B in an alternative embodiment of the present invention, a substrate 10 with display area 11 includes two pixel groups 32 and two column driver chiplets 20 controlling column electrodes 12. In this embodiment, however, the row electrodes 16 of each pixel group 32 are driven in common with two external row drivers 21. The two external row drivers 21 drive the same row electrodes 16 with the same signal in parallel to provide additional current and reduce any voltage drop across the electrodes. In this embodiment, the group row electrodes of one pixel group are driven in common by two or more row drivers.

Figure 1C:
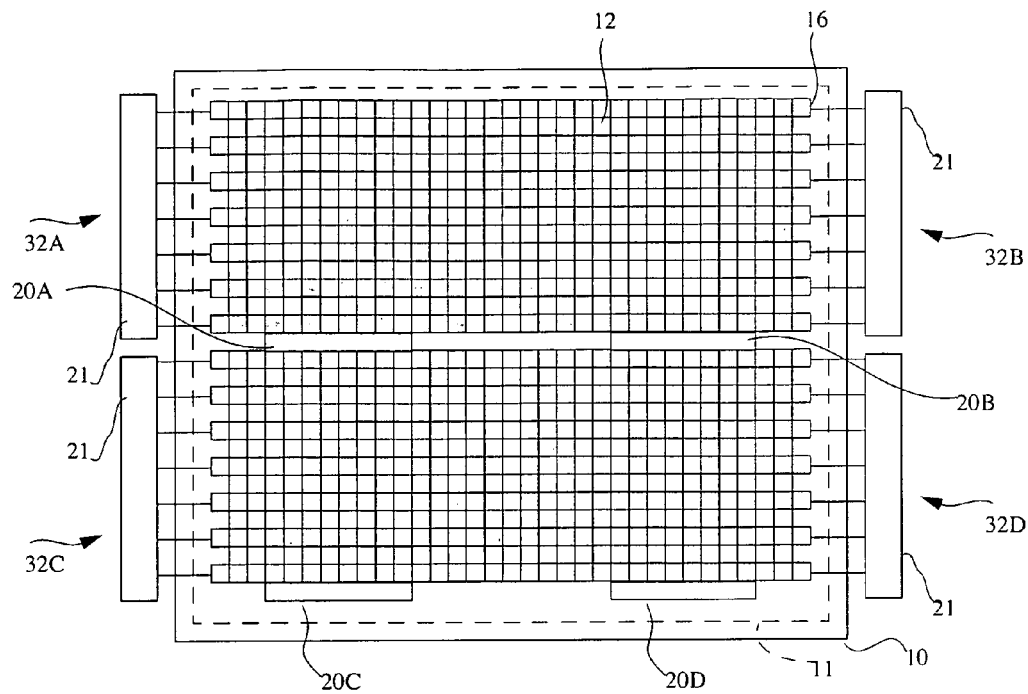
FIG. 1C is a plan view of a substrate with four pixel groups, four column driver chiplets, and two external row drivers according to another embodiment of the present invention.

Turning to FIG. 1C in another embodiment of the present invention, a substrate 10 with display area 11 includes four pixel groups 32A, 32B, 32C, 32D and four column driver chiplets 20A, 20B, 20C, 20D controlling column electrodes 12 in each of the four pixel groups. As in the embodiment of FIG. 1B, two external row drivers 21, drive row electrodes 16 from either side of the substrate 10. In this embodiment, the row electrodes 16 of pixel groups 32A and 32B are driven in common with the same signal, and the row electrodes 16 of pixel groups 32C and 32D are driven in common with the same signal. Hence, the group row electrodes of one pixel group are driven in common by two or more row drivers. The column driver chiplet 20A must be synchronized with column driver chiplet 20B and the column driver chiplet 20C must be synchronized with column driver chiplet 20D. In this embodiment, two or more separate pixel groups have group row electrodes in common and the common group row electrodes are driven in common by two or more row drivers.

Figure 1D:
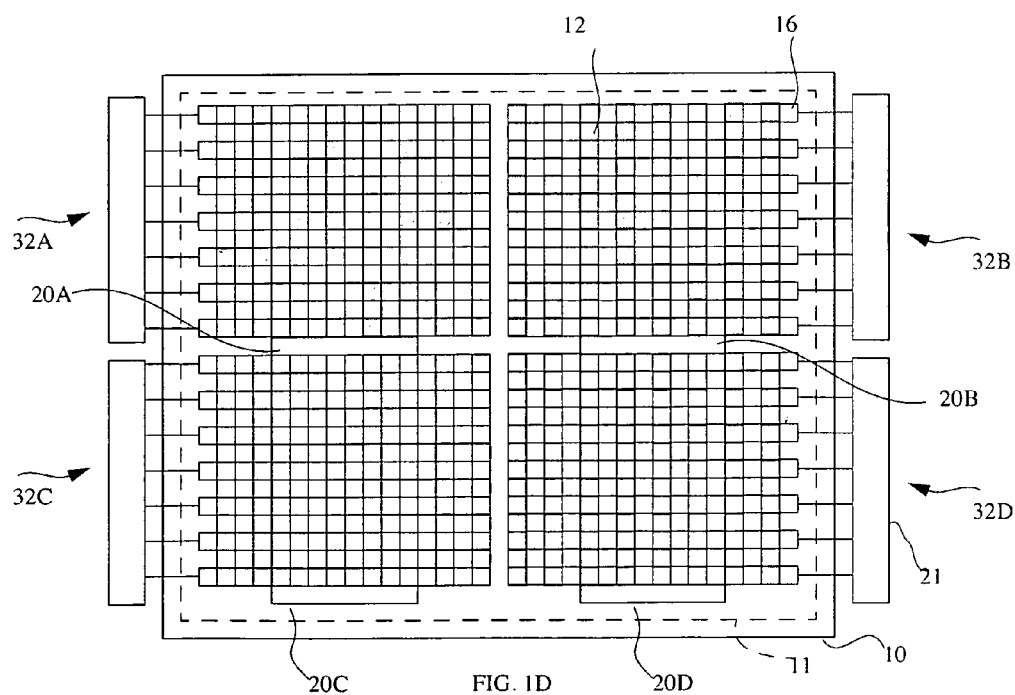
FIG. 1D is a plan view of a substrate with four pixel groups, four column driver chiplets, two external row drivers, and separate row electrodes for each pixel group according to yet another embodiment of the present invention.

Referring to FIG. 1D, a substrate 10 with display area 11 includes four pixel groups 32A, 32B, 32C, 32D and four column driver chiplets 20A, 20B, 20C, 20D controlling separate column electrodes 12 in each of the four pixel groups 32A, 32B, 32C, 32D. In contrast to the embodiment of FIG. 1C, in the embodiment of FIG. 1D each of the pixel groups 32A, 32B, 32C, 32D has separate row electrodes 16 electrically connected to a separate external row driver 21. In this embodiment, all of the row electrodes 16 and column electrodes 12 of each pixel group 32A, 32B, 32C, 32D are electrically separate, and each pixel group 32A, 32B, 32C, 32D is controlled independently of any other pixel groups.

The embodiments of FIG. 1A-1D employ row drivers 21 external to the display area 11. However, for large display devices, row electrodes are correspondingly long, and even if the row electrodes are divided in half, as shown in the embodiment of FIG. 1D or the row electrodes 16 are driven from each side of the display area by two row drivers 21, as in the embodiment of FIGS. 1B and 1C, the potential voltage drop along the row electrodes 12 and capacitance of the row electrodes can significantly limit the overall performance of the device. Hence, according to embodiments of the present invention, row drivers are implemented as chiplets and located within the display area as are the column driver chiplets.

Figure 2A:
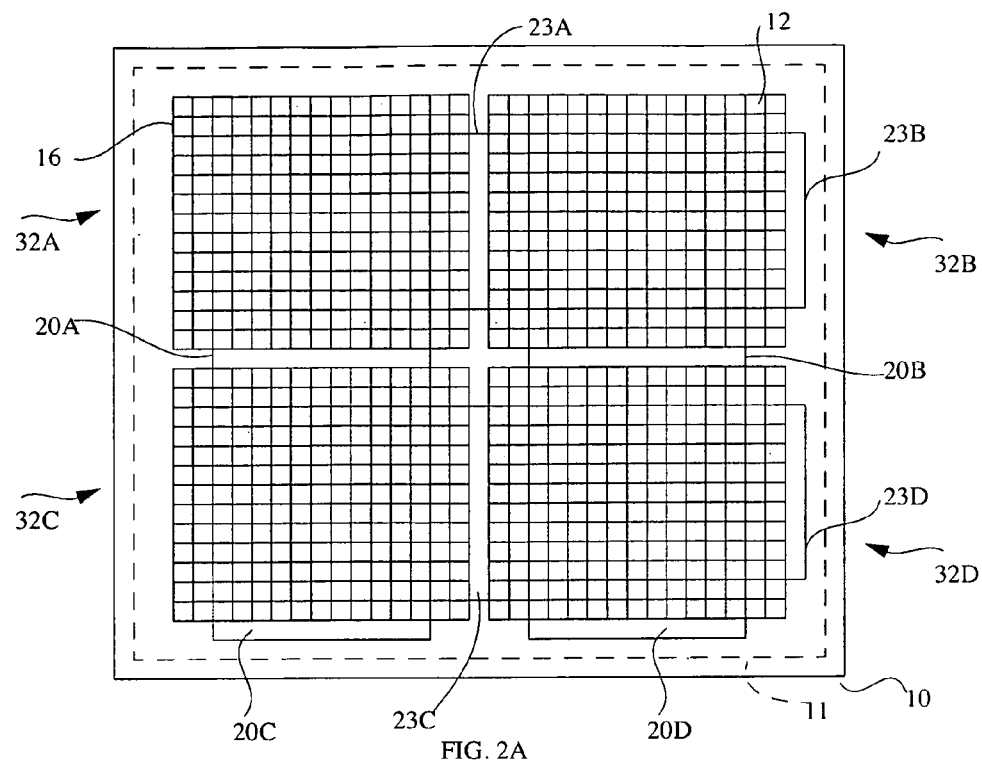
FIG. 2A is a plan view of a substrate with four pixel groups, four column driver chiplets, four row driver chiplets, and separate row electrodes for each pixel group according to an embodiment of the present invention.

Referring to FIG. 2A in one embodiment, a device has four pixel groups 32A, 32B, 32C, 32D formed on a substrate 10 within display area 11, each pixel group 32A, 32B, 32C, 32D having separate group row and group column electrodes 16, 12 and a separate column driver chiplet 20A, 20B, 20C, 20D and a separate row driver chiplet 23A, 23B, 23C, 23D. In this embodiment, each pixel group 32A, 32B, 32C, 32D can operate independently from any other pixel group. The row and column driver chiplets 23A, 23B, 23C, 23D, 20A, 20B, 20C, 20D are located in the display area 11 and, in the figure, the column driver chiplets 20A, 20B, 20C, 20D drive the pixel groups 32A, 32B, 32C, 32D above the column driver chiplets 20A, 20B, 20C, 20D while the row driver chiplets 23A, 23B, 23C, 23D drives the pixel groups 32A, 32B, 32C, 32D to the left of the row driver chiplets 23A, 23B, 23C, 23D For example, pixel group 32A is controlled by column driver chiplet 20A and row driver chiplet 23A. Pixel group 32B is controlled by column driver chiplet 20B and row driver chiplet 23B. Pixel group 32C is controlled by column driver chiplet 20C and row driver chiplet 23C. Pixel group 32D is controlled by column driver chiplet 20D and row driver chiplet 23D. Note that the number of column electrodes 16 controlled by the column driver chiplet can differ from the number of row electrodes 12 controlled by the row driver chiplet. The row driver chiplets 23A, 23B, 23C, 23D and the column driver chiplets 20A, 20B, 20C, 20D can thus be of different sizes or have a different number of connection pads or drive a different number of electrodes.

Figure 2B:
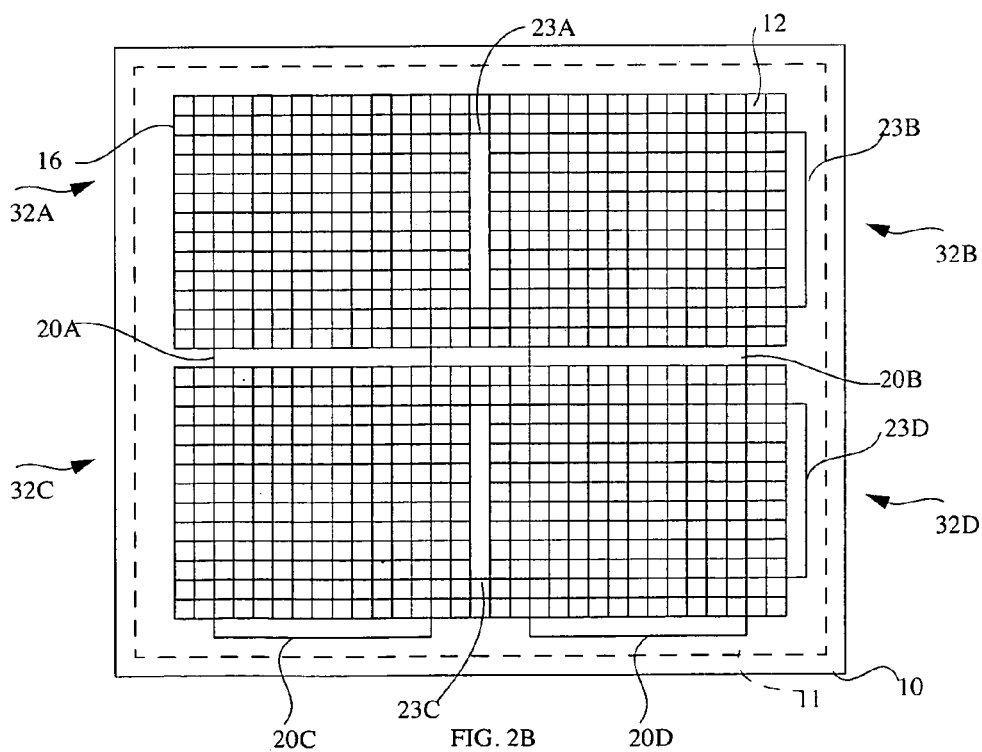
FIG. 2B is a plan view of a substrate with four pixel groups, four column driver chiplets, four row driver chiplets, and shared row electrodes for pixel groups in a common row according to another embodiment of the present invention.

Referring to FIG. 2B in an alternative embodiment, a device has four pixel groups 32A, 32B, 32C, 32D formed on a substrate 10 within display area 11, each pixel group 32A, 32B, 32C, 32D having separate group column electrodes 16 and a separate column driver chiplet 20A, 20B, 20C, 20D respectively. The row electrodes 12 in the same row, however, are shared between multiple pixel groups and are driven in common with the same signal by multiple row driver chiplets. Each row electrode 16 is electrically continuous across pixel group 32A and 32B. Likewise, each row electrode 16 is electrically continuous across pixel group 32C and 32D. The row and column driver chiplets are located in the display area 11 and in the figure, each column driver chiplet drives the pixel group located directly above it. FIG. 2B differs from FIG. 2A in that the row electrodes are shared between horizontally adjacent pixel group pairs. For example, pixel group 32A is controlled by column driver chiplet 20A and row driver chiplets 23A and 23B. Pixel group 32B is controlled by column driver chiplet 20B and row driver chiplets 23A and 23B. Pixel group 32C is controlled by column driver chiplet 20C and row driver chiplets 23C and 32D. Pixel group 32D is controlled by column driver chiplet 20D and row driver chiplets 23C and 23D. In this embodiment, row driver chiplets 23A and 23B must output the same signals and row driver chiplets 23C and 23D must output the same signals. Likewise, column driver chiplet 20A must be coordinated with column driver chiplet 20B and column driver chiplet 20C must be coordinated with column driver chiplet 20D so that image information is properly displayed on the right rows. Using two row driver chiplets in parallel with electrically common row electrodes can improve the distribution of current in the row electrodes between the pixel groups (e.g. 32A and 32B or 32C and 32D) sharing the row electrodes.

Figure 2C:
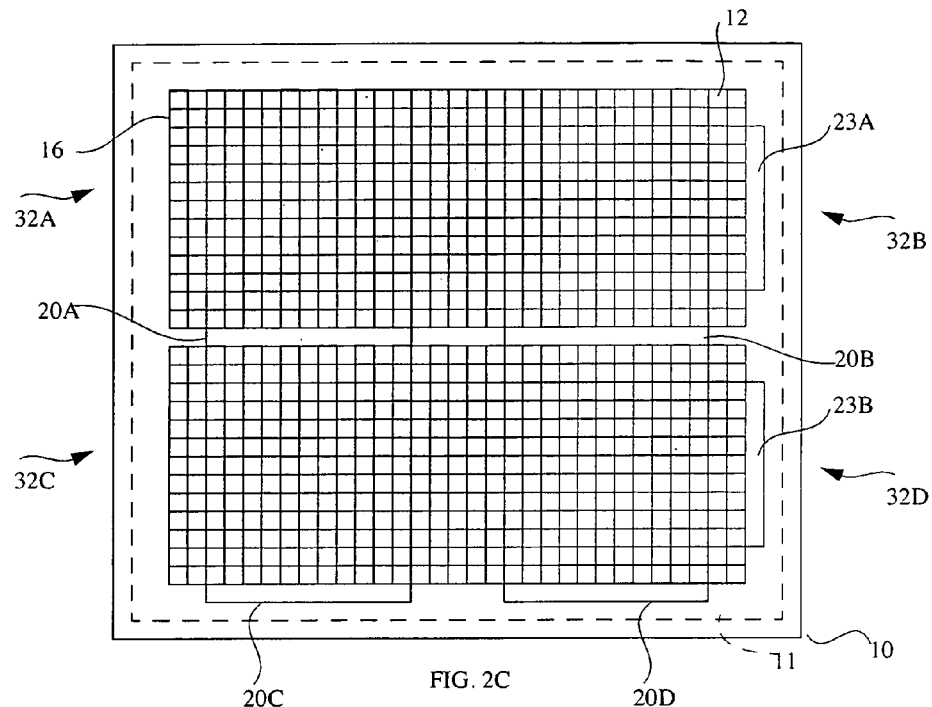
FIG. 2C is a plan view of a substrate with four pixel groups, four column driver chiplets, two row driver chiplets, and shared row electrodes for pixel groups in a common row according to another embodiment of the present invention.

Referring to FIG. 2C in another embodiment of the present invention, a device has four pixel groups 32A, 32B, 32C, 32D formed on a substrate 10 within display area 11, each pixel group 32A, 32B, 32C, 32D having separate group column electrodes 16 and a separate column driver chiplet 20A, 20B, 20C, 20D respectively. The row electrodes 12, however, are shared between multiple pixel groups and are driven in common by a single row driver chiplet. The row and column driver chiplets 23A, 23B, 20A, 20B, 20C, 20D are located in the display area 11 and, in the figure, the column driver chiplets 20A, 20B, 20C, 20D each drive the pixel group above it while each row driver chiplet drives the row electrodes to its left. FIG. 2C differs from FIG. 2B in that only one row driver chiplet drives the row electrodes. For example, pixel group 32A is controlled by column driver chiplet 20A and row driver chiplet 23A. Pixel group 32B is controlled by column driver chiplet 20B and row driver chiplet 23A. Pixel group 32C is controlled by column driver chiplet 20C and row driver chiplet 23B. Pixel group 32D is controlled by column driver chiplet 20D and row driver chiplet 23B. In this embodiment, column driver chiplets 20A and 20B must be coordinated and column driver chiplets 20C and 20D must be coordinated. Using a single row driver chiplet reduces the number of row driver chiplets.

Figure 2F:
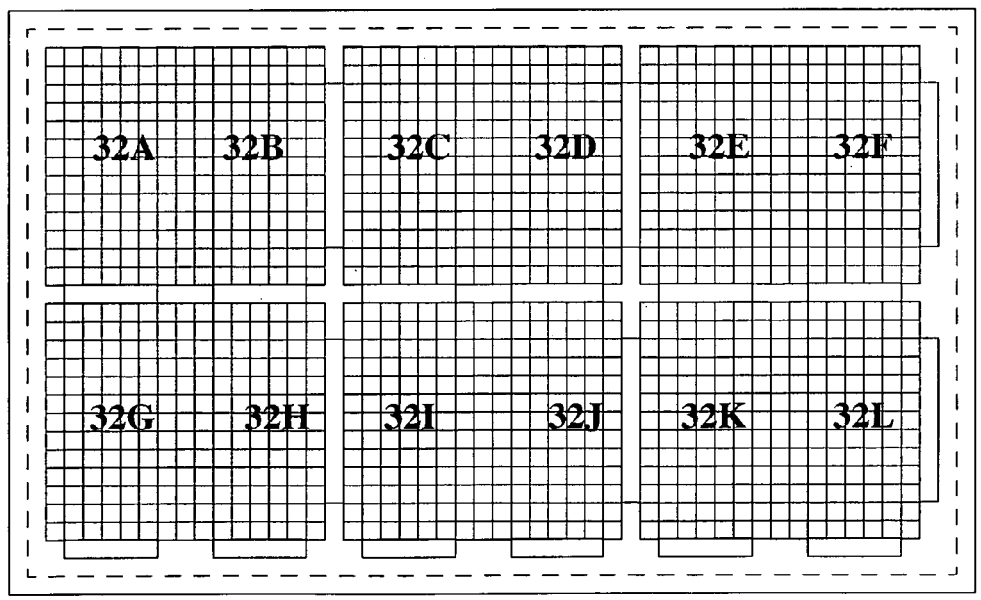
FIG. 2F is a plan view of a substrate with twelve pixel groups, six row driver chiplets, with each row driver chiplet driving the rows of two pixel groups according to an embodiment of the present invention.
Figure 2D:
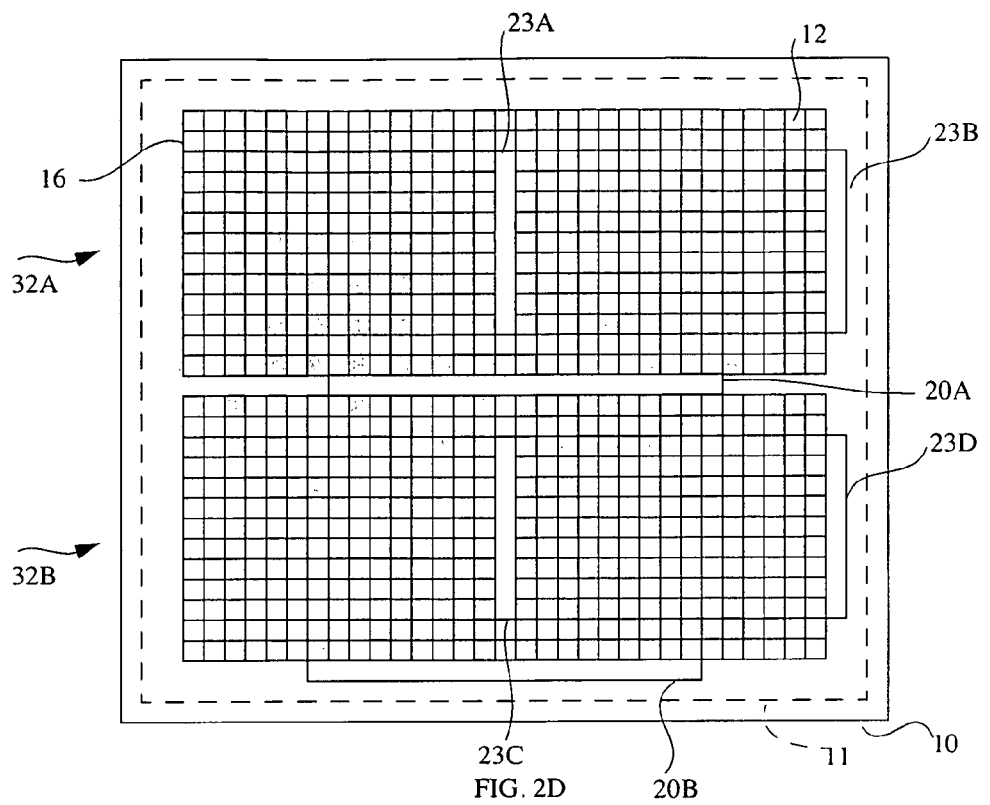
FIG. 2D is a plan view of a substrate with two pixel groups, two column driver chiplets, and two row driver chiplets for each pixel group according to yet another embodiment of the present invention.

Turning to FIG. 2D in another embodiment of the present invention, a device has two pixel groups, 32A and 32B, formed on a substrate 10 within display area 11, each pixel group 32A, 32B having separate group row electrodes 16 and a separate column driver chiplet 20A, 20B respectively. The row electrodes 16 are unique to each pixel group 32A, 32B. The row electrodes 16 of each group are driven in common by two independent row driver chiplets. For example, pixel group 32A is controlled by column driver chiplet 20A and row driver chiplet 23A and 23B. Pixel group 32B is controlled by column driver chiplet 20B and row driver chiplets 23C and 23D. Using multiple row driver chiplet for row electrodes improves the current distribution in the electrodes.

Figure 2E:
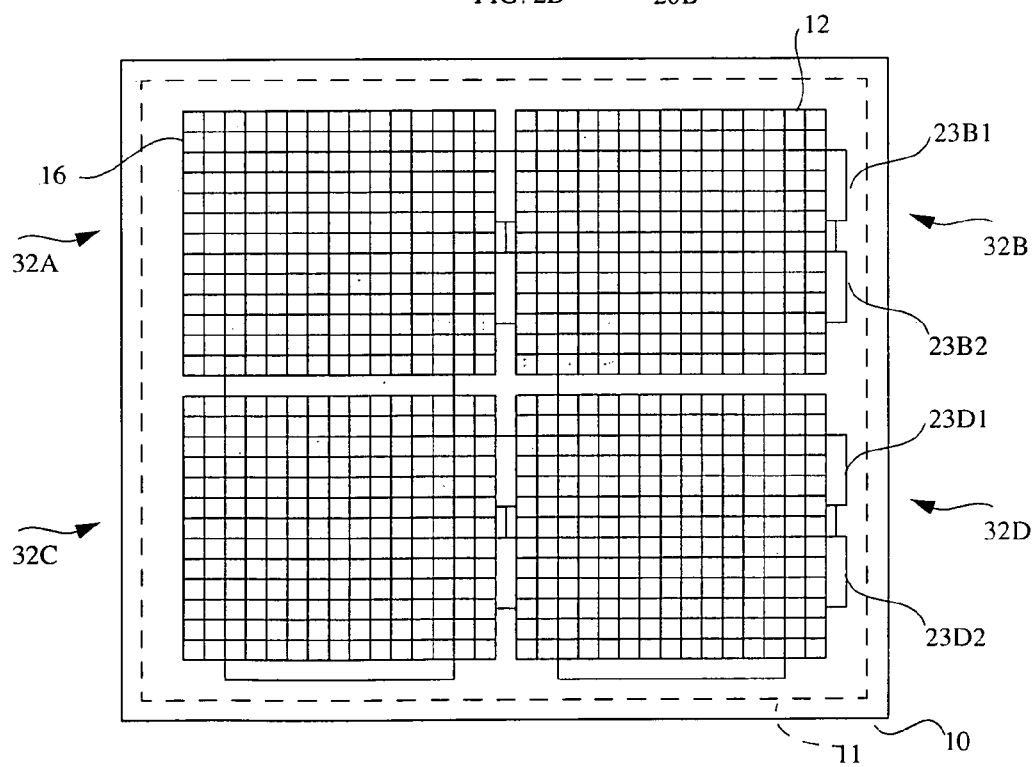
FIG. 2E is a plan view of a substrate with four pixel groups, four column driver chiplets, eight row driver chiplets forming four row drivers, and separate row electrodes for each pixel group according to an embodiment of the present invention.

Referring to FIG. 2E in another embodiment of the present invention, a device has four pixel groups 32A, 32B, 32C, 32D formed on a substrate 10 within display area 11, each pixel group 32A, 32B, 32C, 32D having separate group column electrodes 16 and separate row driver electrodes 12. Each pixel group 32A, 32B, 32C, 32D has a separate column driver chiplet and a separate row driver chiplet. In this embodiment, however, the row driver comprises two electrically-connected chiplets. The row driver for pixel group 32B, for example, comprises chiplet 23B1 and chiplet 23B2. Similarly, the row driver for pixel group 32D, for example, comprises chiplet 23D1 and chiplet 23D2. The chiplet pairs act together to control the group row electrodes of one pixel group by shifting the row enable signal from one chiplet to the next. While the illustration shows two chiplets, in other embodiments of the present invention, three, four, or more chiplets can be connected in series to form a single rotary serial shift register. Pixel groups 32A and 32C also have row drivers comprising two chiplets. This can be useful, for example, if the number of pixels defined by a column electrode supported by a column driver chiplet is greater than the number of row electrodes that can be supported by a single row driver chiplet. This might occur if the circuit complexity of the row driver chiplet is greater than the circuit complexity of the column driver chiplet, or if the number of connection pads in the row driver chiplets is less than the number of connection pads in the column driver chiplets. By increasing the number of row electrodes 12 in a pixel group, the number of pixel groups and column driver chiplets is decreased.

Figure 2G:
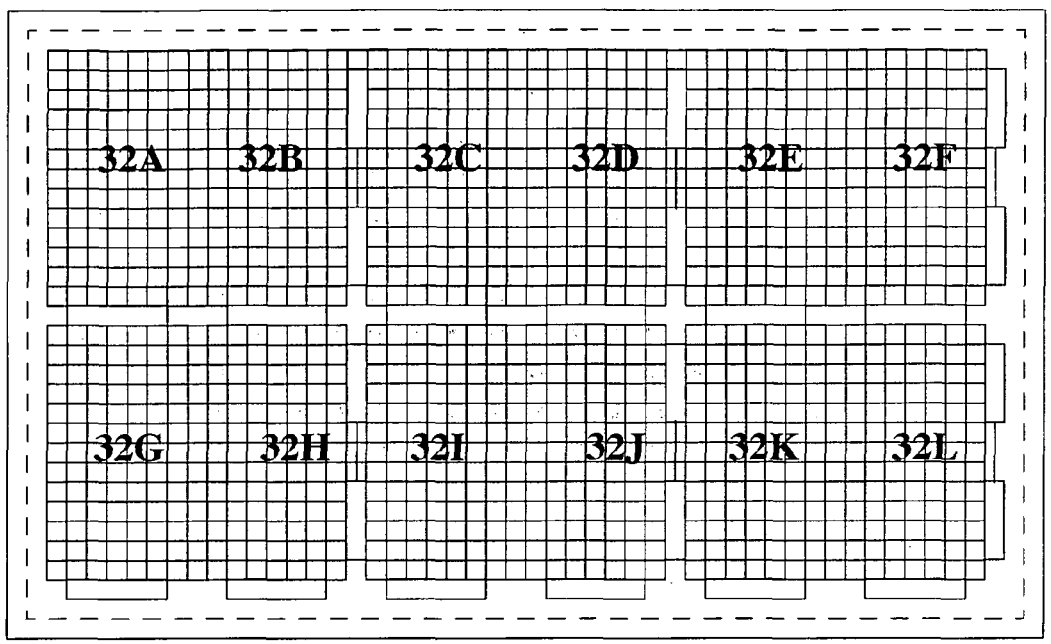
FIG. 2G is a plan view of a substrate with twelve pixel groups, six pairs of row driver chiplets, with each row driver chiplet driving the rows of six pixel groups according to an embodiment of the present invention.

FIG. 2F illustrates an embodiment of the present invention having 12 pixel groups 32A-32L. The pixel groups are arranged in pairs (e.g. 32A, 32B) having common row electrodes and a common row driver chiplet. FIG. 2G illustrates an embodiment of the present invention having 12 pixel groups 32A-32L. The group row electrodes of pixel groups 32A-32F are electrically common as are the group row electrodes of pixel groups 32G-32L. Each row driver comprises two chiplets forming a single rotary serial shift register. Pairs of pixel groups share a row driver. Thus three chiplets comprising half of a rotary serial shift register drive half of the row electrodes in common for pixel groups 32A-32F while three chiplets comprising the other half of the rotary serial shift register drive the remaining half of the row electrodes in common for pixel groups 32A-32F. Pixel groups 32G-32L are driven likewise. This arrangement has the advantage of providing superior current distribution in the row electrodes and reducing the number of column driver chiplets. Similar arrangements having more or fewer column driver chiplets and more or fewer chiplets comprising each rotary serial shift registers are included within the present invention. The number of column driver and row driver chiplets will be determined at least by the electrical characteristics of the chiplets, the characteristics of the row and column electrodes, the size of the pixel elements formed by the overlap of the row and column electrodes, and the rate (frequency) at which the pixels are driven with data.

FIGS. 2B, 2C, and 2D illustrate various embodiments of the present invention in which the number of pixel groups supported by each row driver chiplet varies. In general, it is useful to determine the number of row and column driver chiplets in a device by evaluating the row and column electrode capacitance and voltage drop for a specific device. The number of row and column driver chiplets can be chosen depending on the acceptable electrical characteristics of the device. The number of column electrodes supported by a column driver chiplet is also limited by the number of connection pads and the amount of circuitry that can be constructed in the column driver chiplet. Likewise, the number of row electrodes supported by a row river chiplet is limited by the number of connection pads and the amount of circuitry that can be constructed in the row driver chiplet. The number of row and column chiplets is also limited by the necessary refresh rate for a signal displayed on the device. If a higher refresh rate is required, then the number of row and column driver chiplets is increased. If a lower refresh rate is required, then the number of row and column driver chiplets is decreased.

Figure 10:
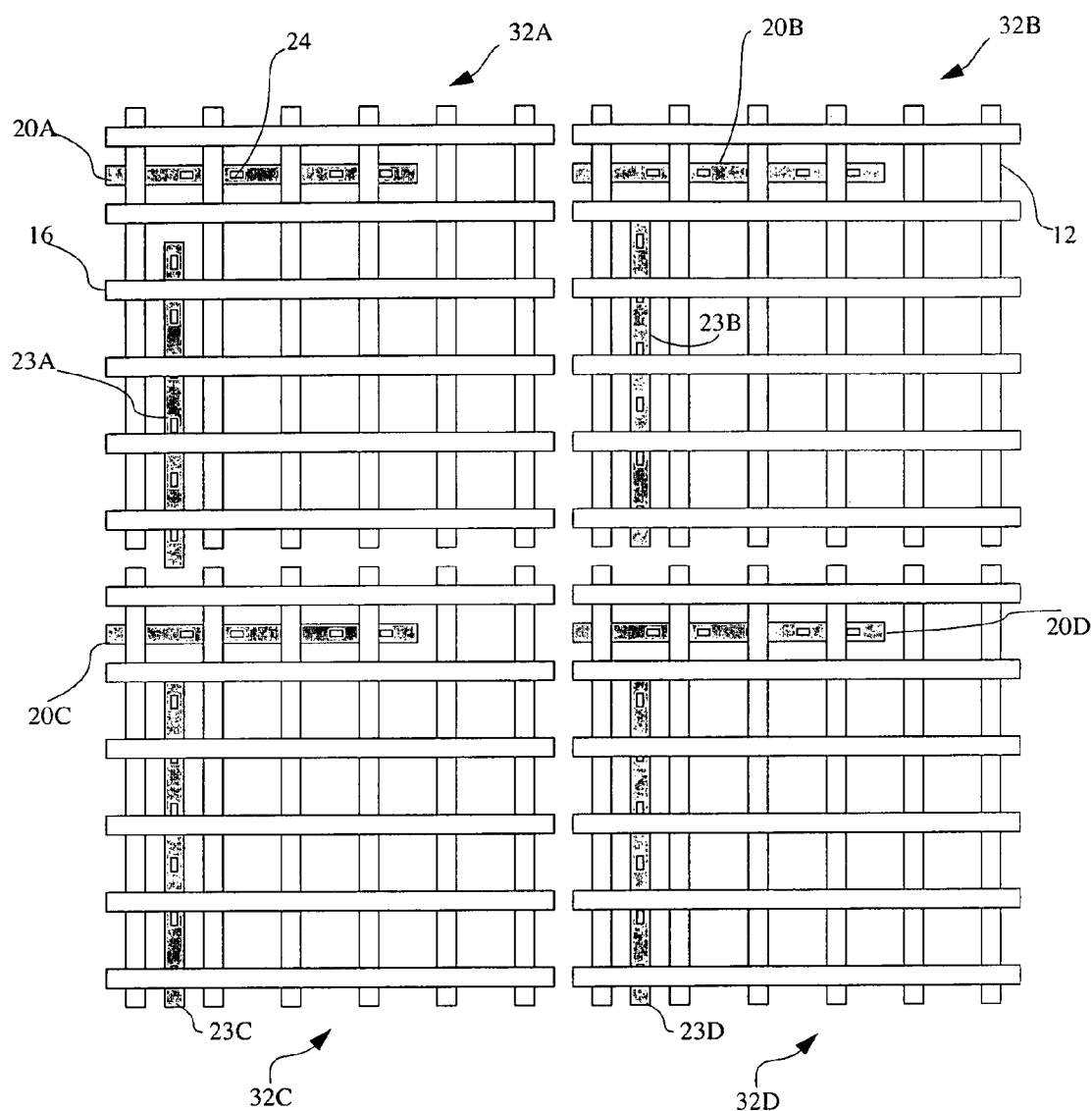
FIG. 10 is a plan view of a substrate portion with four pixel groups, group row and column electrodes, row driver chiplets, and column driver chiplets according to an embodiment of the present invention.

FIG. 10 is an alternative top-view illustration of four pixel groups 32A, 32B, 32C, 32D, each pixel group having independent row electrodes 16 and column electrodes 12 and separate column driver chiplets 20A, 20B, 20C, 20D and row driver chiplets 23A, 23B, 23C, 23D. Chiplet connection pads 24 are indicated but no-connection wires between the chiplets or the connection pads and electrodes. In this illustration, pixel group 32A is controlled by column controller 20A and row controller 23A Pixel group 32B is controlled by column controller 20B and row controller 23B. Pixel group 32C is controlled by column controller 20C and row controller 23C. Pixel group 32D is controlled by column controller 20D and row controller 23D. The relative locations of the chiplets within a pixel group or over the substrate is not critical, so long as the group column electrodes are properly connected to the corresponding column driver chiplet and the group row electrodes are properly connected to the corresponding row driver chiplet.

For example, a chiplet connected to 16 electrodes has been constructed. It has also been calculated that a row driver chiplet can support the current from 128 columns. A display device that has 480 rows and 640 columns with three colors has 921,600 light-emitting elements. In a stripe configuration, this equals 1,920 columns and 480 rows. Hence, 120 column driver chiplets (each supporting 16 electrodes) are required in the row direction. At least 30 row driver chiplets (each supporting 16 electrodes) are necessary in the column direction. Therefore, 3600 column driver chiplets are required (120×30) and 450 row driver chiplets (30 by 1920/128) for a total of 4050 chiplets. In a larger device design using 32 electrode connections per chiplet for a high-definition device (presumed to be 2048 by 1024 for simplicity) with four-element (RGBW) pixels, an array of 8192 by 1024 light-emitting elements must be controlled. To support this design, 256 column driver chiplets are necessary (2048×4/32) across the width of the device and 32 row driver chiplets are required (1024/32) across the height of the device. Therefore, 8192 column driver chiplets are necessary (256×32) Assuming that each row driver chiplet can support 256 columns, 1024 row driver chiplets are required (8192×32/256) for a total of 9216 chiplets. If a rotary serial shift register comprising two chiplets (e.g. as in FIG. 2E) is employed, the column driver chiplets must drive longer wires and control more pixels, but fewer chiplets need be employed. For example, if the rotary serial shift register controls 64 rows with two chiplets having 32 electrode connections each, only 5120 chiplets are needed (4096 column driver chiplets and 1024 row driver chiplets), but the pixel groups are twice as large.

In any pixel array controlled by scanning rows, flicker is a concern. Typically, passive-matrix display devices are limited to approximately 100 rows. If more rows than that are included, the drivers cannot cycle through the rows fast enough to prevent perceptible flicker. In contrast, the present invention provides advantages in that the electrode lengths are greatly reduced so that the electrodes can be controlled at a much faster rate. Furthermore, by forming separately controlled pixel groups, multiple rows can be simultaneously enabled, greatly reducing the number of rows that are sequentially driven. Therefore, using the present invention, very large pixel arrays can be constructed that provide superior image quality. Since no active-matrix thin-film transistors need to be constructed on the substrate (typically at high temperatures), manufacturing costs can be greatly reduced and a wider variety of substrate materials employed, for example flexible, plastic substrates.

Figure 3:
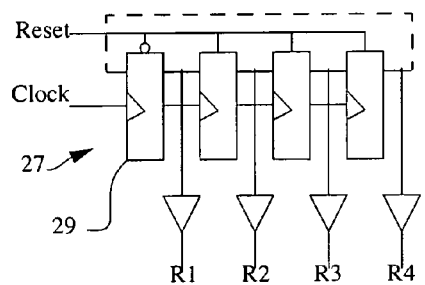
FIG. 3 is a simplified schematic of row driver chiplet circuitry according to an embodiment of the present invention.

In an embodiment of the present invention, the row drivers include a rotary serial shift register for selecting a single row electrode at one time. Referring to FIG. 3, a simplified circuit diagram illustrates a mechanism for controlling four rows in a row driver. The row drivers include a reset circuit responsive to a reset signal to enable a single row and a shifting circuit that receives a row select signal to progressively and uniquely enable a single row. A series of four shift registers 29 are connected so that, with the application of a row select signal (equivalent to a shift register clock) to all of the shift registers 29, the data in each shift register is shifted to the next, serially-connected shift register 29; the data in the last shift register 29 is transferred to the first. Hence; the circuit provides a rotary, serial shift register 27. The reset signal sets all of the shift registers to a zero except the first, which is set to one. The shift register 29 having a one enables the corresponding row (R1, R2, R3, R4) so that, as the one value shifts through the rotary, serial shift register 27, each row is progressively enabled and only one row R1, R2, R3, R4 is enabled at a time. (As is known in the art, enable and disable signals can be either high or low, 0 or 1, and the signal levels described herein can be exchanged.)

Although the output of the last shift register in the series is connected to the input of the first shift register in the series, the present invention is not limited to that embodiment. For example, the reset signal may be periodically employed to set the shift register to the same state as would occur when the data value in the last shift register is shifted to the first. By periodically employing the reset signal, the electrical connection from the last shift register to the first shift register may be omitted (and is therefore shown as a dashed line), thereby reducing the wiring complexity of the row driver. This arrangement is particularly useful when multiple chiplets are employed to form the rotary serial shift register since, in that case, the omitted electrical connection from the last shift register to the first would have to be routed outside the chiplets and over the substrate. Furthermore, in the multiple-chiplet rotary serial shift register embodiment, it is useful to set only the first register of the first chiplet in the connected series of chiplets comprising the rotary serial shift register to an enable value. The remainder of the chiplets can set the first register within the chiplet to a disable value.

Figure 4:
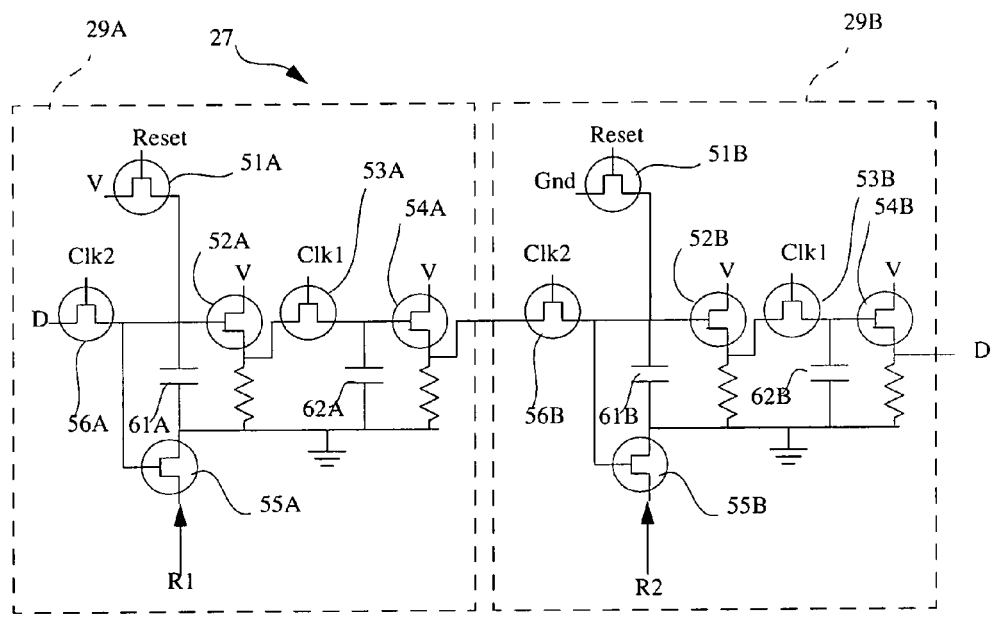
FIG. 4 is a more detailed schematic of a portion of the row driver chiplet circuitry of FIG. 3 according to an embodiment of the present invention.
Figure 4:
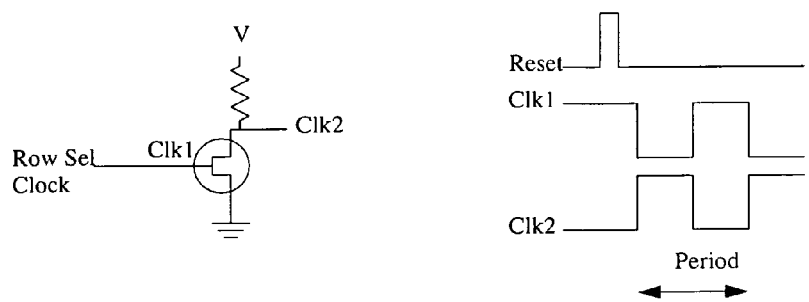

Referring to FIG. 4, in a more detailed embodiment of the circuit shown in FIG. 3, and according to an embodiment of the present invention, two serially-connected shift registers 29A, 29B are illustrated (rather than the four shift registers 29 in FIG. 3). The output of the second shift register 29B is connected to the first shift register 29A (as indicated with connection D). A two-phase clock is employed with the timing diagram indicated. Each shift register (e.g. 29A) includes two capacitors (e.g. 61A, 62A) and four transistors (e.g. 52A, 53A, 54A, 55A) forming a serial shifting circuit. A reset transistor forming a reset circuit is employed to reset the circuit and drive a row electrode. When a reset signal is applied to transistor 51A when clk1 is high and clk2 is low (clk1 is the inverse of clk2), the first capacitor 61A is charged, transistor 52A is turned on, second capacitor 62A is charged and transistor 53A, is turned on, providing a high signal to shift register 29B. The row-controlling transistor 55A is also turned on to uniquely enable row R1. When the same reset signal is applied to shift register 29B through transistor 51B, the capacitors 61B, 62B are discharged, transistor 53B is turned on, and transistors (52B, 54B) are pulled low so that the row-controlling transistor (55B) turns off row R2 and signal D is set low. (The same reset circuit can be used to set first shift register 29A to a low value in a multi-chiplet embodiment of the rotary serial shift register.)

Figure 5:
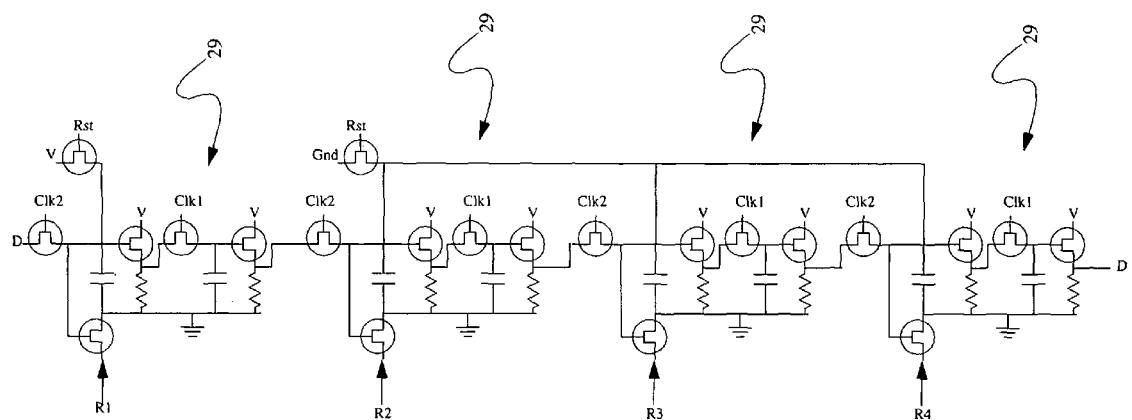
FIG. 5 is a more detailed schematic of the row driver chiplet circuitry of FIG. 3 according to an embodiment of the present invention.

The reset signal is then returned to zero and clk2 enabled (disabling clk1). The signal provided to the shift register 29B through transistor 56B then charges the capacitor 61B and turns on the transistor 52B. In contrast, signal D drains the capacitor 61A through transistor 56A and turns off transistor 52A. When clk1 is subsequently enabled and clk2 disabled, the value stored in the first capacitor 61B is transferred to the second capacitor 62B, thus performing a complete data shift from one shift register 29A to the next 29B. Row R1 is then disabled and row R2 enabled. Thus, the embodiment of FIG. 4 illustrates a rotary serial shift register 27 with a double-buffered registers 29A, 29B shifted with a multi-phase clock signal. FIG. 5 illustrates the same circuit with four serially connected double-buffered, multi-phase shift registers 29 comprising a rotary serial shift register. The circuit can be extended with more shift registers 29 to support as many rows as desired and can fit into a row driver chiplet, or series of row driver chiplets. The rotary serially connected shift register can pass data into another chiplet to make the shift register as long as is desired, so long as the end register is connected to an input on the first register (see FIG. 2E).

Figure 6:
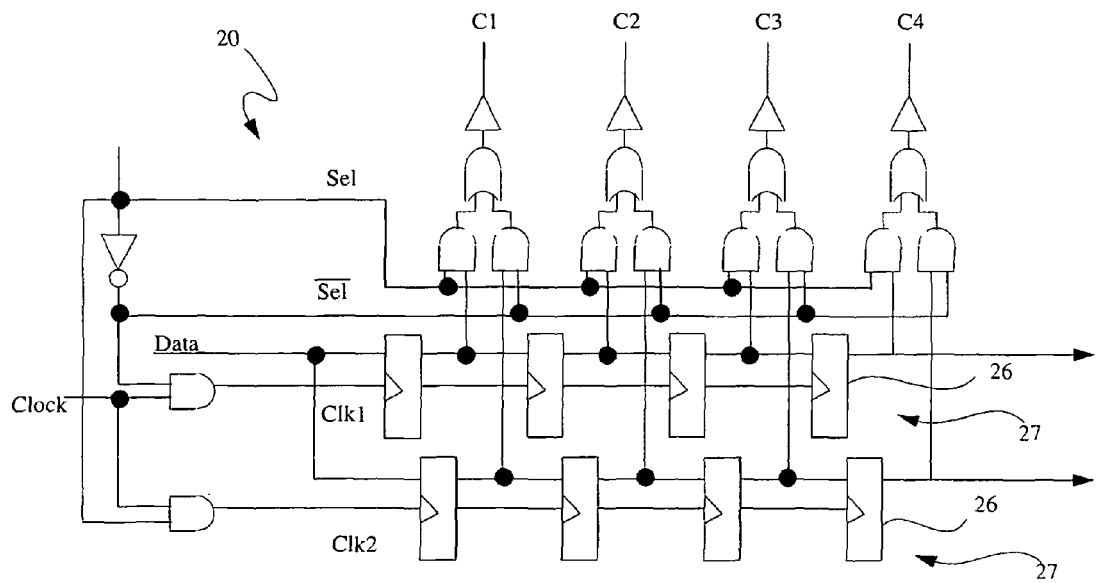
FIG. 6 is a simplified schematic of column driver chiplet circuitry according to an embodiment of the present invention.

Turning to FIG. 6, a column driver chiplet circuit 20 according to an embodiment of the present invention is illustrated. As shown in FIG. 6, the column driver chiplet circuit 20 include two data value registers 26, each data value register 26 storing at least as many analog data values as there are columns in the pixel group to which the column driver chiplet is connected. In this case, four data value registers are illustrated for a chiplet that can control four column electrodes. The data value registers 26 are serial registers and data values are stored in the serial data value registers 26 by shifting data into the registers 26, controlled by a clock signal. A select signal controls into which data value register 26 the data is transferred and to which column electrode driver the data is presented.

Figure 7:
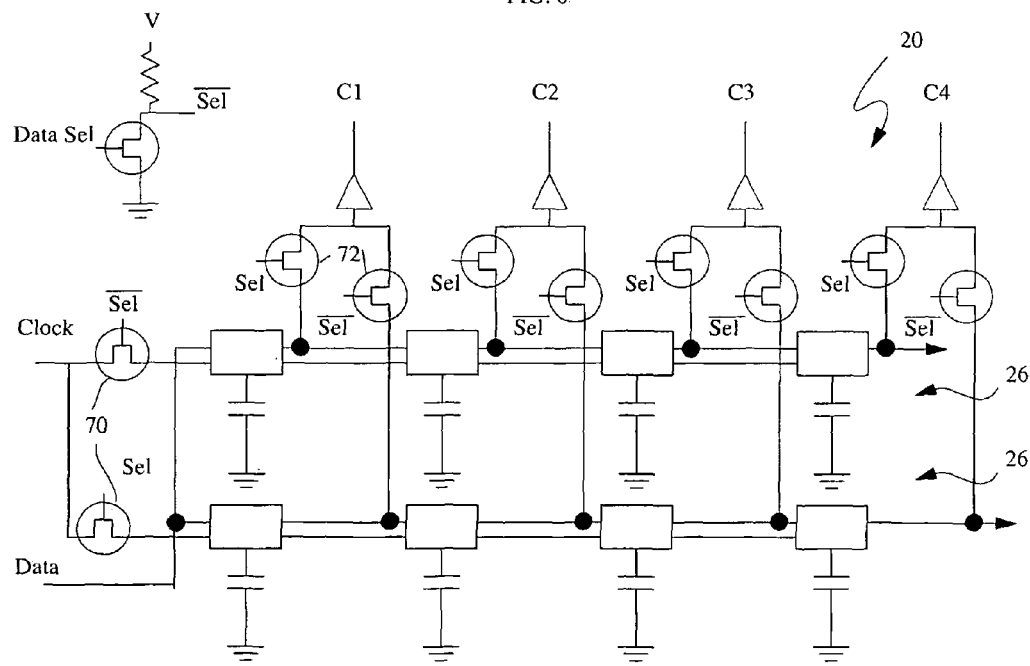
FIG. 7 is a more detailed schematic of the row driver chiplet circuitry of FIG. 6 according to an embodiment of the present invention.

A more detailed circuit diagram of a circuit useful for a column driver chiplet 20 is illustrated in FIG. 7. Two serially-connected analog shift registers are controlled by a clock signal. Analog shift registers are known in the art and employed for example in both CCD and CMOS imagers. They typically employ a multi-phase clock to shift analog values (represented by charges in a capacitor or semiconductor well) from one register to the next. A select signal and its inverse select the data value register into which the analog data is shifted through transistors 70. Similarly, select transistors 72 present the analog data values in each data value register to a column electrode driver to drive the column electrodes C1, C2, C3, C4 in a pixel group. Note that the column driver chiplets can be serially connected so that an entire row of data values can be shifted through the data value registers that are not selected, the select signal switched so that the data in the data value register is selected for output to the column electrodes, and the other data value register loaded with data using the clock signal. In this way, data values are alternately loaded and driven onto the column electrodes in a simple and efficient manner.

It is useful to note that the signal used to select the data in the column driver chiplet data value register 26 is the same signal as can be employed to shift the row driver rotary serial shift register 27.

Figure 11:
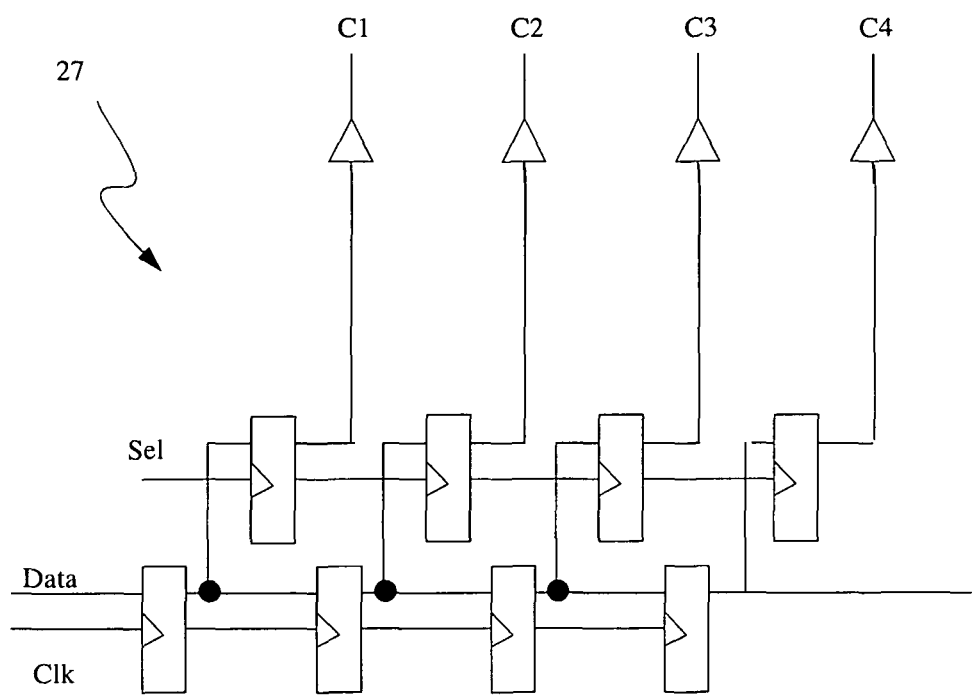
FIG. 11 is a plan view of a substrate portion with four pixel groups, group row and column electrodes, row driver chiplets, and column driver chiplets according to an embodiment of the present invention.

As illustrated in FIG. 6, a column driver chiplet circuit 20 can alternately select the data output from two serial shift registers 27. In an alternative embodiment of the present invention illustrated in FIG. 11, one serial shift register 27 can be employed to shift data into the chiplet and a register used to store the shifted data upon the application of a select signal. The stored data can then be used to control the column electrodes while the next set of data are shifted into the serial shift register. This embodiment has the advantage of reducing the amount of circuitry required in the chiplet.

The present invention provides reduced costs over the prior art. Conventional, active-matrix backplanes employ relatively low-performance and expensive thin-film semiconductor materials. The row driver chiplets need not have the same number of connection pads, or the same layout of connection pads. Moreover, the number of rows that the row driver chiplets drive need not be the same as the number of columns that the column driver chiplets drive. The row driver and column driver chiplets can be located in a wide variety of locations, so long as they are electrically connected to the corresponding row or column electrodes. Locations are generally selected to provide routing paths for electrical connections to chiplets and to space the chiplets from each other at a required positional tolerance suitable for the manufacturing process employed. Moreover, the technology, processes, or construction of row driver chiplets can be different from the technology, processes, or construction of column driver chiplets. By construction is meant the process limitations, materials, and manufacturing processes employed to construct the row and column driver chiplets. For example, one chiplet can employ digital designs, processes, and materials while the other employs analog. Alternatively, one chiplet can employ relatively high-voltage designs, processes, and materials while the other employs relatively low-voltage. Again, one chiplet can employ semiconductor substrate materials or doping (e.g. n- or p-doping) while the other employs different materials or doping. The chiplets can also employ different circuit schematics. The chiplet controlling the independent drive direction requires circuitry to receive image data, requires one or more memory locations for image data per output, and controls relatively small currents and functions better when implemented with smaller line-width semiconductor processes. The chiplet controlling the common drive direction does not receive image data or require image data memory, but is required to switch relatively large currents and therefore functions better when implemented with wider line-width semiconductor processes.

In a further embodiment of the present invention, the chiplet connection pads 24 can be directly connected to a row or column electrode 16, 12. However, such connections can cause the chiplets to be larger than necessary. In another embodiment of the present invention, the chiplets can be aligned in any orientation with respect to the pixel groups and substrate, including aligning an edge of a chiplet with a row or column electrode. Indeed, different chiplets can be differently aligned. Moreover, a display device can include a plurality of row driver chiplets and a separate plurality of column driver chiplets distributed over the substrate, each chiplet having a long dimension and a short dimension, the long dimension of the row driver chiplet orthogonal to the long dimension of the column driver chiplet. Such an arrangement facilitates the routing of busses in a single layer, for example a metal layer. Chiplets can be rectangular, with two opposite sides of the rectangle being longer than the other two opposite sides, defining a chiplet with a large aspect ratio having long sides and short sides. A long side of a chiplet can be aligned in the same direction as row electrodes or column electrodes. For example, it can be helpful to align a long side of a row driver chiplet with column electrodes and a long side of a column electrode with row electrodes.

Connection pads can be connected with wiring to the row electrodes. Vias can be employed to connect from one wiring layer to another or to connection pads and are formed between, for example, the column electrodes to avoid electrical shorts with the column electrodes. Since considerable wiring can be necessary to electrically connect the connection pads to the row and column electrodes, a top emitter configuration can be preferred, in which the top electrode is transparent and the bottom electrode can be reflective. The substrate can also be opaque.

Chiplets may have a single row or multiple rows of connection pads 24 along a relatively long side of the chiplet longer than a relatively shorter neighboring side. Circuitry in the row driver chiplets can be different from the circuitry in the column driver chiplets. In particular, row drivers can employ very simple circuits with lower data rates but may switch large currents compared to a column driver. Moreover, the number of rows controlled by the row driver chiplet can be different from the number of columns driven by the column driver chiplet. Hence different circuits can be used in the different drivers, or even different manufacturing processes or technologies employed to make the different drivers.

The chiplets can be connected to an external controller through a buss or through multiple busses (not shown in the drawings, for clarity). The buss can be a serial, parallel, or point-to-point buss and can be digital or analog. A serial buss is one in which data is re-transmitted from one chiplet to the next on electrically separated electrical connections while a parallel buss is one in which data is simultaneously broadcast to all of the chiplets on an electrically common electrical connection. A buss is connected to the chiplets to provide signals, such as power, ground, data, or select signals. More than one buss separately connected to one or more controllers can be employed.

In operation, a controller receives and processes an information signal according to the needs of the display device and transmits the processed signal and control information through one or more busses to each chiplet in the device. The processed signal includes luminance information for each light-emitting pixel element corresponding to the associated row and column driver chiplets. The luminance information can be stored in an analog or digital storage element corresponding to each light-emitting pixel element. The chiplets then sequentially activate the row and column electrodes to which they are connected. When both the row and column electrode for a pixel is activated, current can flow through the pixel defined by the row and column electrode to emit light. Typically, an entire group of row electrodes or group of column electrodes within a pixel group is activated simultaneously by activating all of the group column electrodes and one row electrode at once (or vice versa). The column electrodes are controlled to provide the individual luminance desired for each pixel in the row. Then a second row is selected and the process repeats until all of the rows are activated and all of the pixels emit light. The process can then repeat. Separate pixel groups can function independently. Note that the designation of "row" and "column" is arbitrary and the functions of row and column electrodes can be reversed.

Although the sequential activation of separate rows (or columns) in a display device can induce flicker, employing multiple, independently controlled pixel groups reduces the number of rows or columns in each separately controlled pixel group. Since the pixel groups are simultaneously activated, flicker can be greatly reduced. Moreover, because the group row electrodes and group column electrodes can be connected only within a pixel group, the group row electrodes and group column electrodes can be short, reducing the electrode capacitance and resistance and the need for high-power driving circuitry in the chiplets, and the power consumption of the display is reduced. Hence, the portion of time that each pixel row (or column) emits light is increased, flicker is decreased, and current densities decreased at a desired luminance.

The busses can supply a variety of signals, including timing (e.g. clock) signals, data signals, select signals, power connections, or ground connections. The signals can be analog or digital, for example digital addresses or data values. Analog data values can be supplied as charge. The storage registers can be digital (for example comprising flip-flops) or analog (for example comprising capacitors for storing charge).

In various embodiments of the present invention, the row driver or column driver chiplets distributed over the substrate can be identical. However, a unique identifying value, i.e. an ID, can be associated with each chiplet. The ID can be assigned before or, preferably, after the chiplet is located over the substrate and the ID can reflect the relative position of the chiplet on the substrate, that is, the ID can be an address. For example, the ID can be assigned by passing a count signal from one chiplet to the next in a row or column. Separate row or column ID values can be used.

The controller can be implemented as a chiplet and affixed to the substrate. The controller can be located on the periphery of the substrate, or can be external to the substrate and comprise a conventional integrated circuit.

According to various embodiments of the present invention, the chiplets can be constructed in a variety of ways, for example with one or two rows of connection pads along a long dimension of a chiplet. Interconnection busses and wires can be formed from various materials and use various methods for deposition on the device substrate. For example, interconnection busses and wires can be metal, either evaporated or sputtered, for example aluminum or aluminum alloys. Alternatively, the interconnection busses and wires can be made of cured conductive inks or metal oxides. In one cost-advantaged embodiment, the interconnection busses and wires are formed in a single layer.

The present invention is particularly useful for multi-pixel device embodiments employing a large device substrate, e.g. glass, plastic, or foil, with a plurality of chiplets arranged in a regular arrangement over the device substrate. Each chiplet can control a plurality of pixels formed over the device substrate 10 according to the circuitry in the chiplet and in response to control signals. Individual pixel groups or multiple pixel groups can be located on tiled elements, which can be assembled to form the entire display.

According to the present invention, chiplets provide distributed pixel control elements over a substrate. A chiplet is a relatively small integrated circuit compared to the device substrate and includes a circuit including wires, connection pads, passive components such as resistors or capacitors, or active components such as transistors or diodes, formed on an independent substrate. Chiplets are separately manufactured from the display substrate and then applied to the display substrate. The chiplets are preferably manufactured using silicon or silicon on insulator (SOI) wafers using known processes for fabricating semiconductor devices. Each chiplet is then separated prior to attachment to the device substrate. The crystalline base of each chiplet can therefore be considered a substrate separate from the device substrate and over which the chiplet circuitry is disposed. The plurality of chiplets therefore has a corresponding plurality of substrates separate from the device substrate and each other. In particular, the independent substrates are separate from the substrate on which the pixels are formed and the areas of the independent, chiplet substrates, taken together, are smaller than the device substrate. Chiplets can have a crystalline substrate to provide higher performance active components than are found in, for example, thin-film amorphous or polycrystalline silicon devices. Chiplets can have a thickness preferably of 100 um or less, and more preferably 20 um or less. This facilitates formation of the adhesive and planarization material over the chiplet that can then be applied using conventional spin-coating techniques. According to one embodiment of the present invention, chiplets formed on crystalline silicon substrates are arranged in a geometric array and adhered to a device substrate with adhesion or planarization materials. Connection pads on the surface of the chiplets are employed to connect each chiplet to signal wires, power busses and row or column electrodes to drive pixels. Chiplets can control at least four pixels.

Since the chiplets are formed in a semiconductor substrate, the circuitry of the chiplet can be formed using modern lithography tools. With such tools, feature sizes of 0.5 microns or less are readily available. For example, modern semiconductor fabrication lines can achieve line widths of 90 nm or 45 nm and can be employed in making the chiplets of the present invention. The chiplet, however, also requires connection pads for making electrical connection to the wiring layer provided over the chiplets once assembled onto the display substrate. The connection pads must be sized based on the feature size of the lithography tools used on the display substrate (for example 5 um) and the alignment of the chiplets to the wiring layer (for example +/−5 um). Therefore, the connection pads can be, for example, 15 um wide with 5 um spaces between the pads. This means that the pads will generally be significantly larger than the transistor circuitry formed in the chiplet.

The pads can generally be formed in a metallization layer on the chiplet over the transistors. It is desirable to make the chiplet with as small a surface area as possible to enable a low manufacturing cost.

By employing chiplets with independent substrates (e.g. comprising crystalline silicon) having circuitry with higher performance than circuits formed directly on the substrate (e.g. amorphous or polycrystalline silicon), a device with higher performance is provided. Since crystalline silicon has not only higher performance but much smaller active elements (e.g. transistors), the circuitry size is much reduced. A useful chiplet can also be formed using micro-electro-mechanical (MEMS) structures, for example as described in "A novel use of MEMs switches in driving AMOLED", by Yoon, Lee, Yang, and Jang, Digest of Technical Papers of the Society for Information Display, 2008, 3.4, p. 13.

The device substrate can comprise glass and the wiring layers made of evaporated or sputtered metal or metal alloys, e.g. aluminum or silver, formed over a planarization layer (e.g. resin) patterned with photolithographic techniques known in the art. The chiplets can be formed using conventional techniques well established in the integrated circuit industry.

The present invention can be employed in devices having a multi-pixel infrastructure. In particular, the present invention can be practiced with LED devices, either organic or inorganic, and is particularly useful in information-display devices. In a preferred embodiment, the present invention is employed in a flat-panel OLED device composed of small-molecule or polymeric OLEDs as disclosed in, but not limited to U.S. Pat. No. 4,769,292, issued Sep. 6, 1988 to Tang et al., and U.S. Pat. No. 5,061,569, issued Oct. 29, 1991 to VanSlyke et al. Inorganic devices, for example, employing quantum dots formed in a polycrystalline semiconductor matrix (for example, as taught in US Publication 2007/0057263 by Kahen), and employing organic or inorganic charge-control layers, or hybrid organic/inorganic devices can be employed. Many combinations and variations of organic or inorganic light-emitting displays can be used to fabricate such a device, including active-matrix displays having either a top- or bottom-emitter architecture.

The invention has been described in detail with particular reference to certain preferred embodiments thereof, but it should be understood that variations and modifications can be effected within the spirit and scope of the invention.

PARTS LIST

C1-C4 Columns
R1-R4 Rows
D signal
8A column driver chiplet cross section
8A' column driver chiplet cross section
8B row driver chiplet cross section
8B' row driver chiplet cross section
10 substrate
11 display area
12 column electrode
12A, 12B column electrode group
14 light-emitting material
15 light-emitting diode
16 row electrode
16A row electrode group
16B row electrode group
18 adhesive layer
20 column driver chiplet
20A column driver chiplet
20B column driver chiplet
20C column driver chiplet
20D column driver chiplet
21 row driver
22 circuitry
23 row driver chiplet
23A row driver chiplet
23B row driver chiplet
23C row driver chiplet
23D row driver chiplet
23B1 chiplet
23B2 chiplet
23D1 row driver chiplet
23D2 row driver chiplet
24 connection pad
26 data value register
27 rotary serial shift register
28 chiplet substrate
29 shift register
29A shift register
29B shift register
30 pixel
32 pixel group
32A pixel group
32B pixel group
32C pixel group
32D pixel group
32E pixel group
32F pixel group
32G pixel group
32H pixel group
32I pixel group
32J pixel group
32K pixel group
32L pixel group
40 controller
50 transistors
51A, 51B transistors
52A, 52B transistors
53A, 53B transistors
54A, 54B transistors
55A, 55B transistors
56A, 56B transistors
61A, 61B capacitors
62A, 62B capacitors 70 transistors
72 transistors

The invention claimed is:

1. A method of fabricating a display device, comprising the steps of:
providing a substrate having a display area;
forming an adhesion layer over the substrate;
placing two or more column driver chiplets over the substrate and buried within the adhesion layer, wherein at least one of the two or more column driver chiplets is located within the display area;

placing two or more row driver chiplets over the substrate and buried within the adhesion layer, wherein at least one of the two or more row driver chiplets is located within the display area;

forming a plurality of column electrodes over the adhesion layer in the display area extending in a column direction;

depositing one or more layers of light-emitting material over the plurality of column electrodes and over the adhesion layer; and forming a plurality of row electrodes over the one or more layers of light-emitting material extending in a row direction different from the column direction, the one or more layers of light-emitting material and row and column electrodes overlapping to form pixels, wherein the pixels are divided into two or more separate pixel groups, each pixel group having group row electrodes and separate group column electrodes and wherein at least one of the two or more column driver chiplets is located between two different pixel groups and is associated with one of the two different pixel groups, and each of the two or more column driver chiplets is adapted to drive the group column electrodes of an associated pixel group and wherein the column driver chiplets and the row driver chiplets cooperatively drive the column and row electrodes, respectively, to activate the pixels, and wherein each of the two or more row driver chiplets comprises a rotary serial shift register.

2. The method of claim 1, additionally comprising the step of:

connecting the two or more column driver chiplets and the two or more row driver chiplets to a controller, wherein the controller is configured to provide image information and control signals.

\* \* \* \* \*